US 6,647,206 B2

(12) United States Patent
Kudo

(10) Patent No.: US 6,647,206 B2
(45) Date of Patent: Nov. 11, 2003

(54) CAMERA INCLUDING STROBOSCOPIC UNIT

(75) Inventor: Yasunori Kudo, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/294,086

(22) Filed: Nov. 14, 2002

(65) Prior Publication Data

US 2003/0095799 A1 May 22, 2003

(30) Foreign Application Priority Data

Nov. 21, 2001 (JP) ........................................ 2001-356493

(51) Int. Cl.[7] ............................................... G03B 15/05
(52) U.S. Cl. ...................................................... 396/173
(58) Field of Search ................................. 396/173, 164

(56) References Cited

U.S. PATENT DOCUMENTS 5,692,223 A * 11/1997 Ichikawa et al. ....... 396/173 X

FOREIGN PATENT DOCUMENTS

JP    10-206941 A    8/1998

* cited by examiner

*Primary Examiner*—W. B. Perkey
(74) *Attorney, Agent, or Firm*—Frishauf, Holtz, Goodman & Chick, P.C.

(57) ABSTRACT

A camera includes a stroboscopic light emission unit capable of operating at least in an intermittent light emission mode, wherein the camera has a photographing mode setting unit for setting the camera either in a single photographing mode or in a sequential photographing mode, and a light emission period setting unit for setting the period of the intermittent light emission for said stroboscopic light emission unit in accordance with the photographing mode set by the photographing mode setting unit.

10 Claims, 8 Drawing Sheets

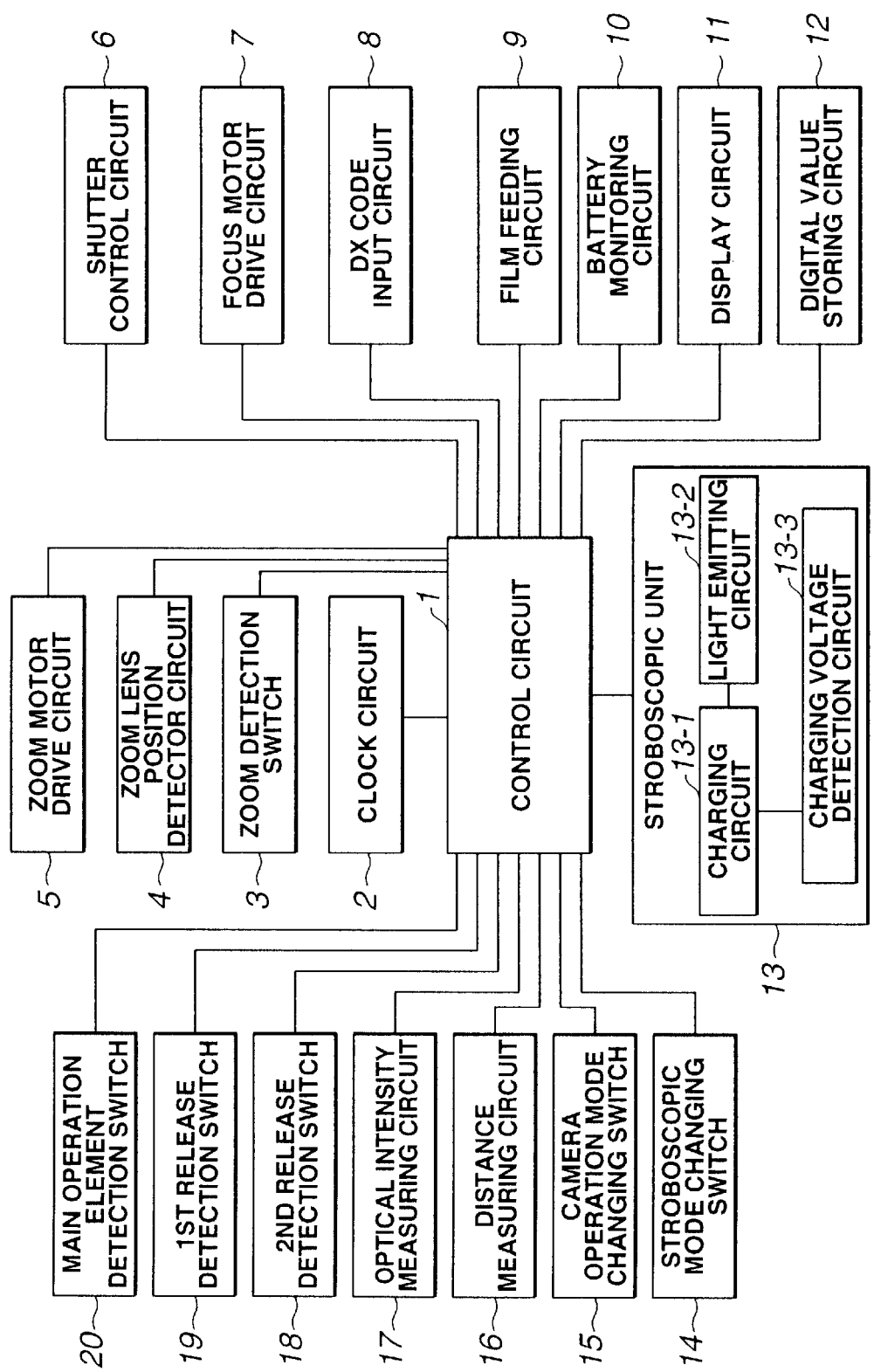

FIG.5A SIGNAL CHG1 
FIG.5B SIGNAL CHG2 
FIG.6A SIGNAL TRG 
FIG.6B SIGNAL FLSH 
FIG.6C SIGNAL Ixe 
FIG.7
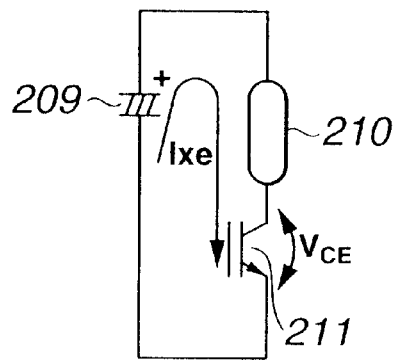

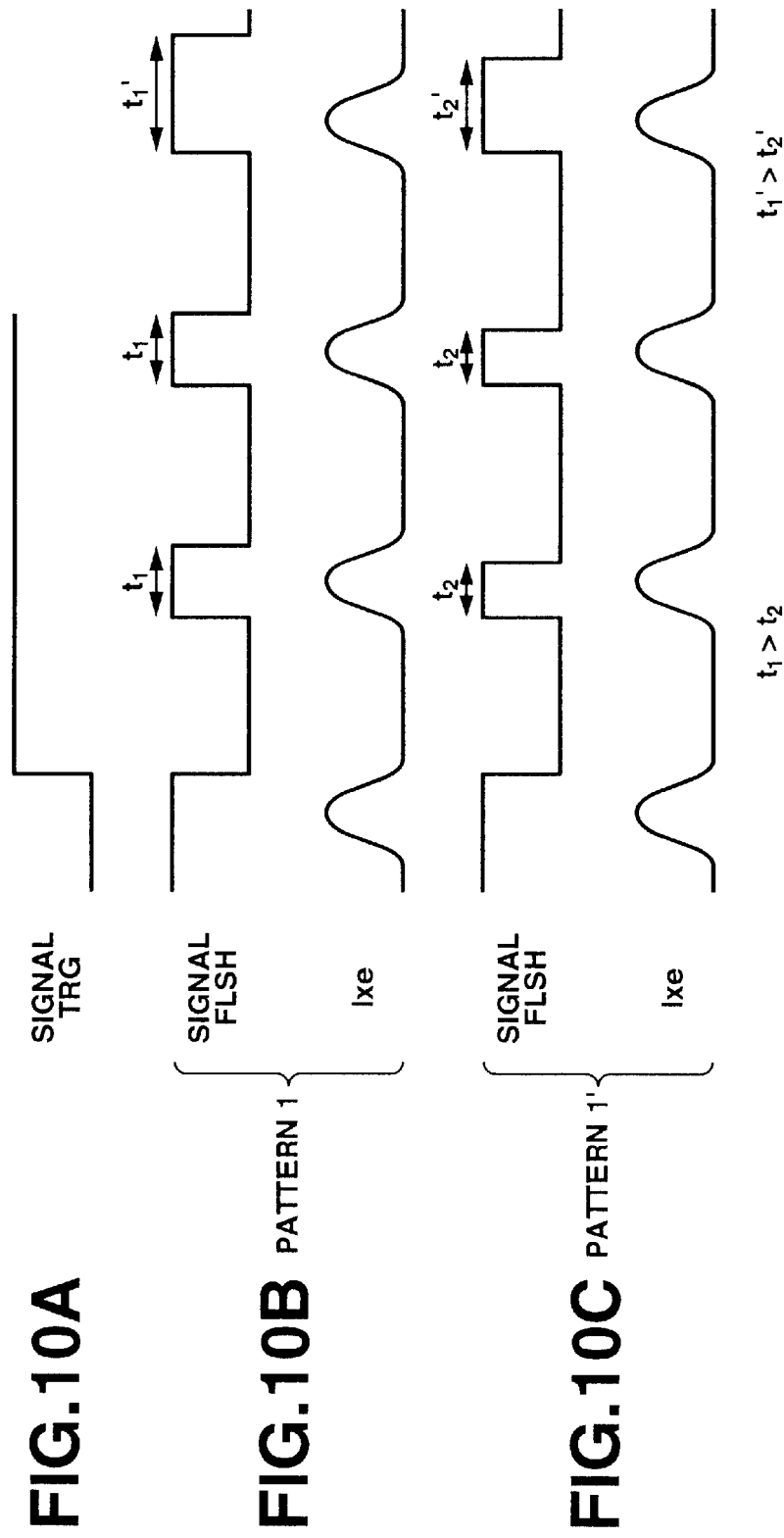

CAMERA INCLUDING STROBOSCOPIC UNIT

This application claims the benefit of Japanese Application No. 2001-356493 filed in Japan on Nov. 21, 2001, the entire contents of which are incorporated herein by reference.

BACKGROUND OF THE INVENTION

1. Field of the Invention

The present invention relates to a camera including a focal-plane shutter and a stroboscopic unit disposed in an aperture of the focal-plane shutter to repeatedly provide a weak intensity light intermittently emitted in a certain period.

2. Description of the Related Art

Various cameras including such a stroboscopic unit disposed in an aperture of the focal-plane shutter to repeatedly provide a weak intensity light intermittently emitted in a certain period, that is, the so called stroboscopic unit capable of providing a flat light emission, have already been proposed.

Such a stroboscopic unit capable of providing a flat light emission is occasionally heated up to a high temperature when an excessive load is applied to switching elements, for instance, such as insulating gate driving transistors which are used to control a current for triggering a xenon lamp (hereinafter briefly denoted as an Xe lamp). An increase in the temperature over a tolerable limit for the switching elements causes the switching elements to be broken down. In particular, such a switching element often breaks down due to an increased temperature in the so-called repeat photographing mode where the photograph operation is continuously repeated.

In order to suppress such an increase in the temperature of the switching elements during the flat light emission of the stroboscopic unit, a method for restricting the time interval of flat light emission using heat sensing means has been proposed in Japanese Unexamined Patent Application No. 10-206941.

If, however, the time interval of the flat light emission is limited by the heat sensing means in the case of the stroboscopic unit being heated beyond a predetermined temperature, there is a possibility that a user misses an optimum shutter chance. Otherwise, he is concerned about a possible trouble of the camera.

SUMMARY OF THE INVENTION

Accordingly, the present invention provides a camera including a stroboscopic unit, wherein a photographing can sequentially be made without missing a shutter chance, and further switching elements for controlling the current of an Xe lamp or Xe light-emitting tube can be prevented from breaking down due to heat.

In an aspect of the invention, a camera including a stroboscopic light emission unit capable of operating at least in an intermittent light emission mode is provided, wherein the camera comprises a photographing mode setting unit for setting the camera either in a single photographing mode or in a sequential photographing mode, and a light emission period setting unit for setting the period of the intermittent light emission for the stroboscopic light emission unit in accordance with the photographing mode set in the photographing mode setting unit.

Further objects, features and advantages of the present invention will become apparent from the following description with reference to the accompanying drawings.

BRIEF DESCRIPTION OF THE DRAWINGS

FIG. 4 is a block diagram showing the total system in the embodiment of the camera;

FIG. 5A is a time chart for elucidating the function of the stroboscopic unit in the embodiment of the camera according to the invention;

FIG. 5B is another time chart for elucidating the function of the stroboscopic unit in the embodiment of the camera according to the invention;

FIG. 6A is another time chart for elucidating the function of the stroboscopic unit in the embodiment of the camera according to the invention;

FIG. 6B is another time chart for elucidating the function of the stroboscopic unit in the embodiment of the camera according to the invention:

FIG. 6C is another time chart for elucidating the function of the stroboscopic unit in the embodiment of the camera according to the invention:

FIG. 7 is a simplified diagram of a circuit comprising a charging capacitor, an Xe lamp and a switching element in the stroboscopic unit in the embodiment of the camera;

FIG. 10A is another time chart for elucidating the function of the stroboscopic unit in the embodiment of the camera;

FIG. 10B is another time chart for elucidating the function of the stroboscopic unit in the embodiment of the camera; and FIG. 10C is another time chart for elucidating the function of the stroboscopic unit in the embodiment of the camera.

DESCRIPTION OF THE PREFERRED EMBODIMENTS

Figure 1:
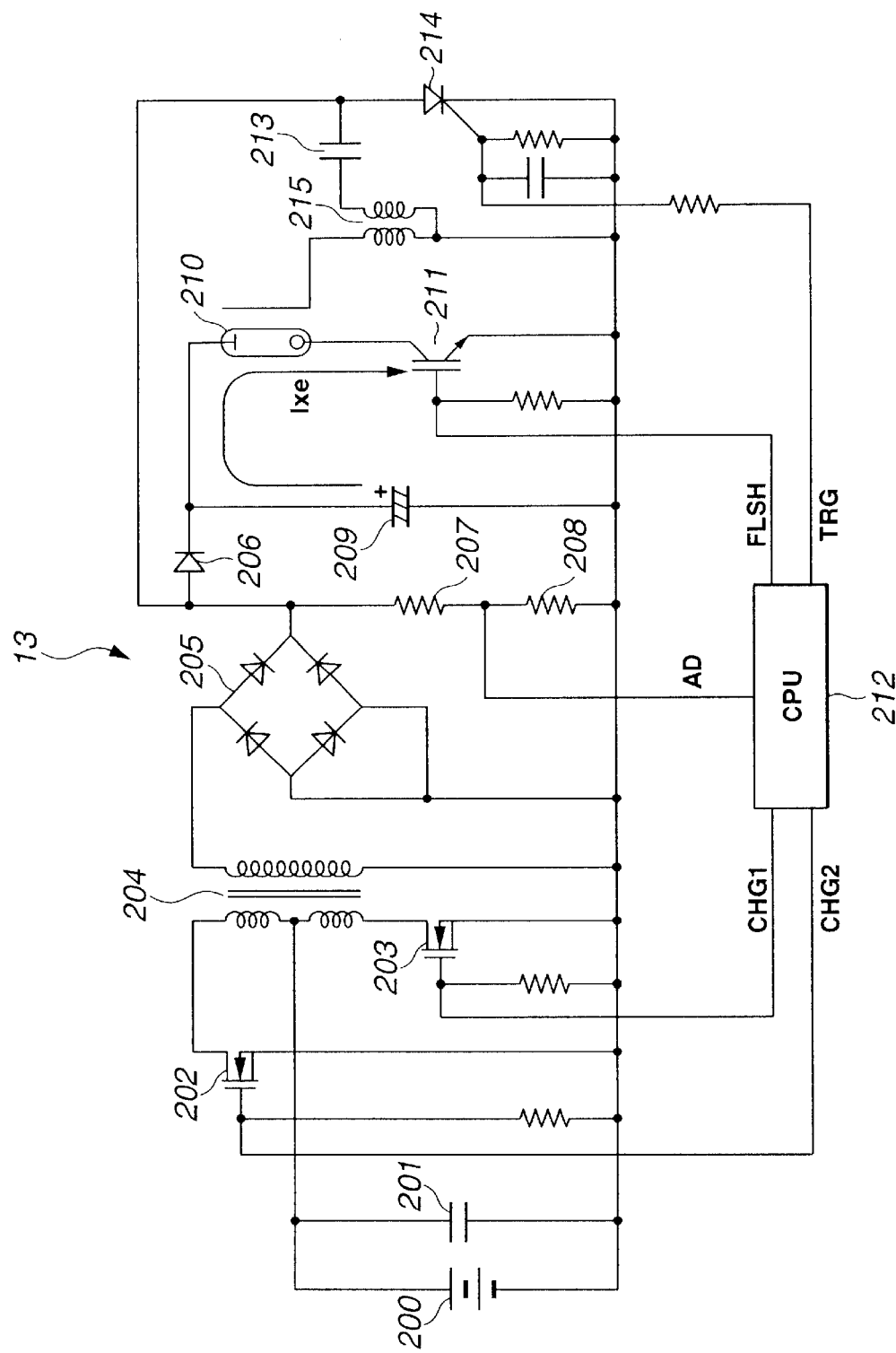
FIG. 1 is a circuit diagram showing the circuit arrangement of a stroboscopic unit in an embodiment of a camera according to the invention.

Referring now to the drawings, embodiments of the invention will be described.

Figure 2:
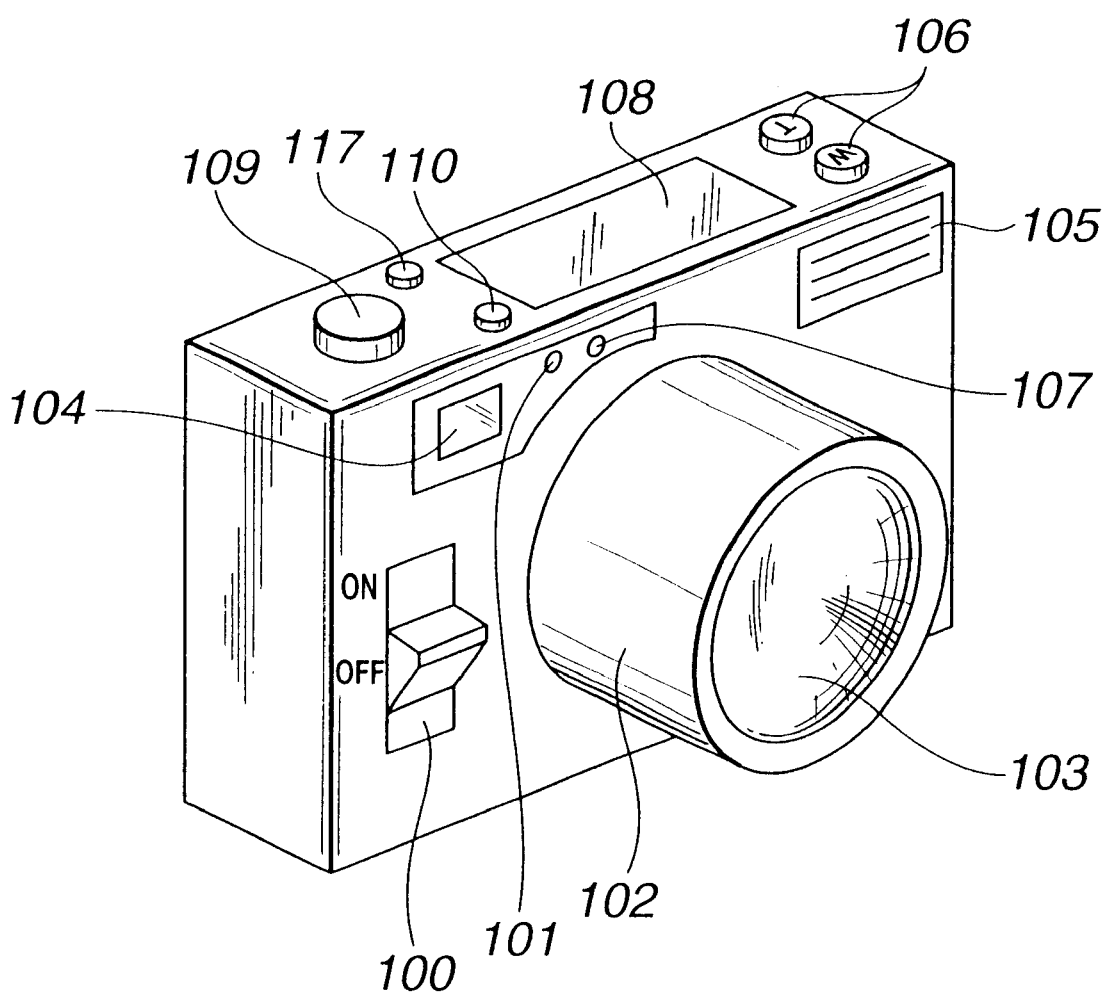
FIG. 2 is a front perspective illustration in the embodiment of the camera.
Figure 3:
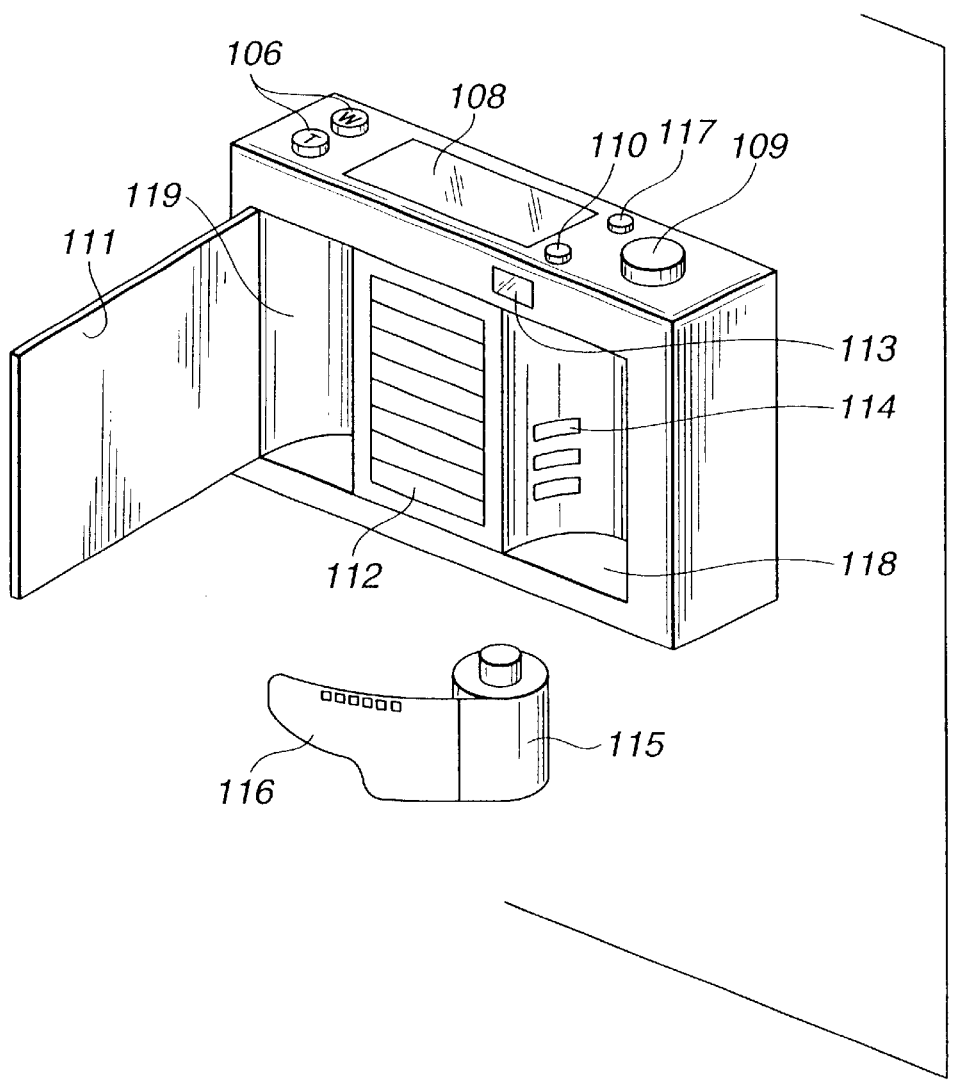
FIG. 3 is a rear perspective illustration in the embodiment of the camera.

FIG. 1 is a circuit diagram representing the circuit arrangement of a stroboscopic unit in an embodiment of a camera according to the invention; FIG. 2 is a perspective illustration of the camera viewed from the front side; and FIG. 3 is a perspective illustration of the camera viewed from the rear side. In addition, FIG. 4 is a block diagram showing the total system of the camera.

The camera in the embodiment of the invention is of a focal-plane shutter type, and includes a supporting frame 102 for carrying a lens 103 at the center on the front side of the camera main body, as shown in FIG. 2. On the left side of the camera main body, a power switch 100 is provided and at the upper part of the camera main body, a finder 104, an AF (auto-focus) window 101, an optical intensity-measuring window 107 and a stroboscopic window 105 are provided.

A display field 108 is disposed at the center of the upper surface of the camera main body, and a release switch 109, a switch 110 for switching the stroboscopic mode and a switch 117 for switching the camera operation mode are disposed on the left side of the upper surface of the camera main body. Moreover, a zoom switch 106 is disposed on the right side of the upper surface of the camera main body.

On the rear surface of the camera, a finder 113 is provided on the upper side thereof, as shown in FIG. 3. At an edge of the rear surface of the camera main body, a rear lid 111 is disposed which is capable of being opened/closed with the aid of a hinge mounted thereon. As can be seen in the state of the rear lid 111 being opened, a focal-plane shutter 112 is disposed on the optical axis of the lens 103 at the center of the inside of the camera. On the right side of the focal-plane shutter 112, a cartridge space 118 having a Dx code reader 114 is disposed on the right side of the focal-plane shutter 112.

A cartridge 115 storing a wound film 116 therein may be mounted in a cartridge space 118, wherein the Dx code (not shown) for indicating the ISO film sensitivity is attached to the cartridge 115 and can be read by the Dx code reader 114.

On the left hand side of the focal-plane shutter 112, a spool chamber 119 having a spool (not shown) is disposed for winding a film 116, which is stored in the cartridge 115 mounted in the cartridge space 118.

Referring now to FIG. 4, the total system of the camera according to the embodiment will be further described. In this drawing, reference numeral 1 means a control circuit comprising a microprocessor for controlling all the functions of the camera. Respective driving circuits connected to the control circuit 1 are operated on the basis of the driving signals therefrom.

A clock circuit 2 is used for counting timing pulses, which are required to drive the camera.

A zoom detection switch 3 is used to sense whether or not the zoom switch 106 is operated, and to transfer the operation information of the zoom switch 106 to the control circuit 1. A zoom lens position detection circuit 4 is used to detect the position of the lens 103 in the supporting frame 102 when the zoom operation is performed, and then to transmit the position information of the lens 103 to the control circuit 1. A zoom motor drive circuit 5 serves to drive a zoom motor (not shown) for zoom-driving the lens 103 on the basis of the control signal from the control circuit 1 in response to the operation information of the zoom switch 106 where the operation information is detected by the zoom detection switch 3. In the case of the zoom motor drive circuit 5 being driven, the actual position of the lens 103 and the position after the zoom drive is made are detected by the zoom lens position detection circuit 4.

A shutter control circuit 6 is used to control the focal-plane shutter 112 for a predetermined duration of order of seconds with a driving signal from the control circuit 1, where the driving signal is determined from the information from a second release detection switch 18 which will be later described, when the release switch 109 is operated.

A focus motor drive circuit 7 is used to control a motor (not shown) for adjusting the focus position of the lens 103 with a driving signal from the control circuit 1, which is determined from the information about the distance to the object to be photographed, the information being obtained by a distance measuring circuit 16, which will be also described later.

A DX code input circuit 8 is used to read the code of the ISO sensitivity in the cartridge 115 with the aid of the Dx code reader 114 and then to transfer the read ISO sensitivity to the control circuit 1.

A film feeding circuit 9 is used to drive a film feeding motor with a control signal from the control circuit 1, in which case, the driving of the film feeding motor is carried out either when the cartridge 115 is installed in the camera and then the film 116 is wound on a spool until the first frame of the film is positioned, or when the frame in which the photograph is taken is wound on the spool at each event of photographing, or when the film 116 is rewound to the cartridge 115 after photographing the final frame.

A battery monitoring circuit 10 is used to detect the voltage of a battery for activating the driving mechanisms in the main body of the camera and to transfer the information about the residual charge of the battery from the detected voltage to the control circuit 1.

A display circuit 11 is used to active the display 108 on the basis of the control signal from the control circuit 1. The display 108 comprises a liquid crystal panel to display in the form of character the information about the number of photographed frames of the film 116, the date, the mode of photographing, the stroboscopic light emission mode, the remote controlled photographing, timer controlled photographing and the like.

A digital value storing circuit 12 is used to store the data for adjusting the driving error in the driving mechanisms of the camera, and it comprises an EEPROM, for example.

A stroboscopic unit 13 is equipped with a charging circuit 131, a light emission circuit 132 and a voltage detection circuit 133 for charging, wherein the charging circuit 131 is used to charge a charging capacitor, which will be later described, the light emission circuit 132 is used to control the Xe lamp for activating the stroboscopic light, using the charge accumulated in the charging capacitor, and the voltage detection circuit 133 is used to start/stop the charging operation of the charge circuit 131 in accordance with the charging state of the charging capacitor, which is sensed by the voltage detection circuit 133.

A stroboscopic mode selection switch 14 corresponds to the stroboscopic mode selection switch 110 and it is used to select and set either the flash light emission mode or the flat light emission mode where in the former mode the stroboscopic circuit 13 is activated to provide a light emission during the opening of the shutter and in the latter mode the stroboscopic circuit 13 is activated to provide flat light emissions (intermittent light emissions) in a predetermined time interval.

A camera operation mode selection switch 15 corresponds to the mode selection switch 117 and it is used to select and set one of the single photographing mode, the sequential photographing mode, remote-controlled photographing mode and the timer controlled photographing mode, where in the single photographing mode a frame is exposed for photographing during the opening of the shutter and in the sequential photographing mode a plurality of frames is sequentially exposed for photographing during the opening of the shutter.

A distance measuring circuit 16 is installed at the AF window 101 and used to measure the distance to an object to be photographed with a conventional method. The result of the measured distance is transferred to the control circuit 1 and thus used to control the focus motor driving circuit 7.

An optical intensity measuring circuit 17 is installed at the optical intensity-measuring window 107 and it is used to measure the brightness of the object to be photographed. The information about the brightness is transferred to the control circuit 1. The shutter control circuit 6 and the opening of the aperture (not shown) are controlled on the basis of both the information about the brightness and the ISO sensitivity of the film 116, which is detected by the Dx code input circuit 8.

A second release detection switch 18 switches on when the release switch 109 is fully pushed, and a first release detection switch 19 switches on when the release switch 109 is half-pushed. The switching information obtained by the first release detection switch 19 and the second release detection switch 18 is transferred to the control circuit 1 and thus used to control the shutter control circuit 6, the focus motor drive circuit 7, the stroboscopic unit 13, the distance measuring circuit 16 and the optical intensity measuring circuit 17 by the control circuit 1 in accordance with the information obtained from the release detection switches 18 and 19.

A main operation element detection switch 20 corresponds to the power switch 100. When this switch 20 is operated to be ON, a power is supplied to various control units including the control circuit 1 from the battery not shown in the drawing.

In the following, the circuit arrangement and the function of the stroboscopic unit 13 will be described with reference to the drawing of FIG. 1.

In FIG. 1, reference numeral 200 indicated the battery for the stroboscopic unit 13. A capacitor 201 for smoothing the voltage supplied from the battery is connected to both ends of the battery 200. The plus terminal of the battery 200 is connected to the center point of two primary windings of a transformer 204. The terminals of the respective primary windings of the transformer 204 are connected to the minus terminal of the battery 200 via the drain and source of MOSFETs 202 and 203. Control signals CHG1 and CHG2 from CPU 212 are supplied to the respective gates of MOSFET's 202 and 203. In this case, CPU 212 corresponds to the control circuit 1.

When the control signal CHG2 supplied from the CPU 212 becomes high (H), the MOSFET 202 turns on, so that a current flows from the battery 200 to the upper primary winding of the transformer 204 via the drain and source of the MOSFET 202. Moreover, when the control signals CHG1 and CHG2 supplied from the CPU 212 becomes high (H), the MOSFET 203 turns on, so that a current flows from the battery 200 to the lower primary winding of the transformer 204 via the drain and source of the MOSFET 203. When the MOSFET's 202 and 203 alternatively turn on, a current flows in the primary windings of the transformer 204 in the reverse direction after each switching, thereby causing to generate a high AC voltage between the terminals of the secondary winding.

A rectifying circuit 205 of a diode bridge is connected between the terminals of the secondary winding of the transformer 204 to transform the high AC current in the secondary winding of the transformer 204 into a DC current.

The output terminal of the rectifying circuit 205 is connected via a backflow suppressing diode 206 either to an electrode of the Xe lamp 210 or further via a charging capacitor 209 to the minus terminal of the battery 200.

The charging capacitor 209 serves to charge the power supply part of the Xe lamp 210 by the DC power supplied from the rectifying circuit 205.

A divider of resistances 207 and 208 is connected between the output terminal of the rectifying circuit 205 and the minus terminal of the battery 200 to divide the voltage of the charging capacitor 209, and the divided voltage is supplied to the CPU 212. The voltage thus divided by the divider of resistances 207 and 208 is converted to a digital voltage value by an A/D converter (not shown) and then supplied to the CPU 212, thereby allowing the charging state of the capacitor 209 to be evaluated.

The other electrode of the Xe lamp 210 is connected to the minus terminal of the battery 200 via the collector and emitter of a switching element 211 comprising an isolation type gate-driven transistor, and a flash signal FLSH from the CPU 212 is supplied to the base of the switching element 211.

When, therefore, the flash signal FLSH is supplied from the CPU 212, the switching element 211 turns on, so that the voltage of the charging capacitor 209 is supplied to the Xe lamp 210 as lighting current for the Xe lamp 210.

A trigger capacitor 213 and the anode of a thyristor 214 are connected to the output terminal of the rectifying circuit 205. The output terminal of the trigger capacitor 213 is connected to the minus terminal of the battery 200 via a primary winding of a trigger transformer 215. An end of the secondary winding of the trigger transformer 215 is connected to the Xe lamp 210 and the other end is connected to the minus of the battery 200. The cathode of the thyristor 214 is connected to the minus terminal of the battery 200 and a trigger signal TRG is supplied from the CPU 212 to the gate of the thyristor 214.

The trigger capacitor 213 is charged by the DC current from the rectifying circuit 205. When the trigger signal TRG is supplied to the gate of the thyristor 214 from CPU 212, the thyristor 214 turns on into the conductive state due to the voltage of the charged trigger capacitor 213, and then the charge in the trigger capacitor 213 is discharged to produce a current in the primary winding of the trigger transformer 215, thereby causing a trigger voltage of, e.g., of order of 4 kV or so to be generated in the secondary winding of the trigger transformer 215. An application of the trigger voltage to the Xe lamp 210 causes to start the discharge therein. In this state, the flash signal FLSH is supplied from CPU 212 to the switching element 211 and then the switching element turns on. Accordingly, a discharge current Ixe flows from the charging capacitor 209 to the Xe lamp 210, thereby enabling the Xe lamp 210 to be lightened.

As a result, the flash signal FLSH from CPU 212 allows the switching element 211 to be ON/OFF controlled, so that the Xe lamp 210 can be lightened in the ON/OFF control.

Referring now to FIGS. 5A and 5B, the light emission of the Xe lamp 210 will be described in detail.

FIGS. 5A and 5B illustrate the ON/OFF signals CHG1 and CHG2 for the MOSFETs 202 and 203, respectively.

The control signals CHG1 and CHG2 supplied from CPU 212 to the MOSFETs 202 and 203 are alternative signals repeatedly exhibiting a high (H) level and a low (L) level in such a phase difference that when one control signal, e.g., CHG1 is at a low (L) level, the other control signal, i.e., CHG2 is at a high (H) level. As a result, a high AC current is output from the secondary winding of the transformer 204 in the ON/OFF switching period of the MOSFETs 202 and 203.

FIGS. 6A, 6B and 6C show a trigger signal TRG for lightening the Xe lamp 210, a flash signal FLSH and a lightening current Ixe flowing in the Xe lamp 210, respectively.

When the trigger signal TRG turns on to a high (H) level by CPU 212 in the ON state of the switching element 211 where the flash signal FLSH is changed into the high (H) level by CPU 212, then the trigger capacitor 213 discharges the accumulated charge so that a trigger voltage is supplied from the output terminal of the trigger transformer 215 to the Xe lamp 210, thereby enabling the Xe lamp 210 to be lightened.

At a predetermined period after the Xe lamp 210 is lightened, the flash signal FLSH from CPU 212 is changed to be at the low (L) level, so that the light emission from the Xe lamp 210 ceases in the OFF state of the switching element 211. In conjunction with this, when the flash signal FLSH changes to be at a high (H) level in the opening state of the focal-plane shutter, the switching element 211 turns on and the Xe lamp 210 results in the flash light emission mode of the Xe lamp 210.

A control of the period of the flash signal FLSH causes to control the ON period of the switching element 211, thereby enabling the lightening current Ixe for the Xe lamp 210 to be varied. In other words, the control of the ON period of the switching element 211 provides to control the lightening current Ixe for the Xe lamp 210, thereby enabling the emitted light intensity to be adjusted.

In the flat light emission, as shown in FIGS. 6A, 6B and 6C, the switching element 211 is ON/OFF-controlled in the state of the focal-plane shutter being opened by the flash signal FLSH in the form of an alternatively repeated pulse with a short period at the high (H) level and low (L) level, so that an intermittent lightening current Ixe is supplied to the Xe lamp 210, thereby causing the Xe lamp 210 to be intermittently lightened.

In the case of the flat light emission, the flash signal repeatedly exhibits the high (H) level and the low (L) level in a predetermined short period and the ON period of the switching element 211 is relatively small. Accordingly, the lightening current Ixe having a small intensity lightens the Xe lamp 210, so that the light emission is intermittently repeated at a small light intensity.

In the following, several problems in the flat light emission (the intermittent light emission) will be described with reference to the drawings in FIGS. 7 and 8.

FIG. 7 is a simplified diagram of a circuit comprising a charging capacitor 209, the Xe lamp 210 and the switching element 211. In the drawing, Ixe is the exciting current, which is supplied from the charging capacitor 209 to the Xe lamp, and Vce is a voltage between the collector and the emitter of the switching element 211. Moreover, FIG. 8 shows a heat loss due to the heating of the switching element 211 as a function of both the exciting current Ixe for the Xe lamp and the voltage Vce between the collector and the emitter of the switching element 211.

Figure 8:
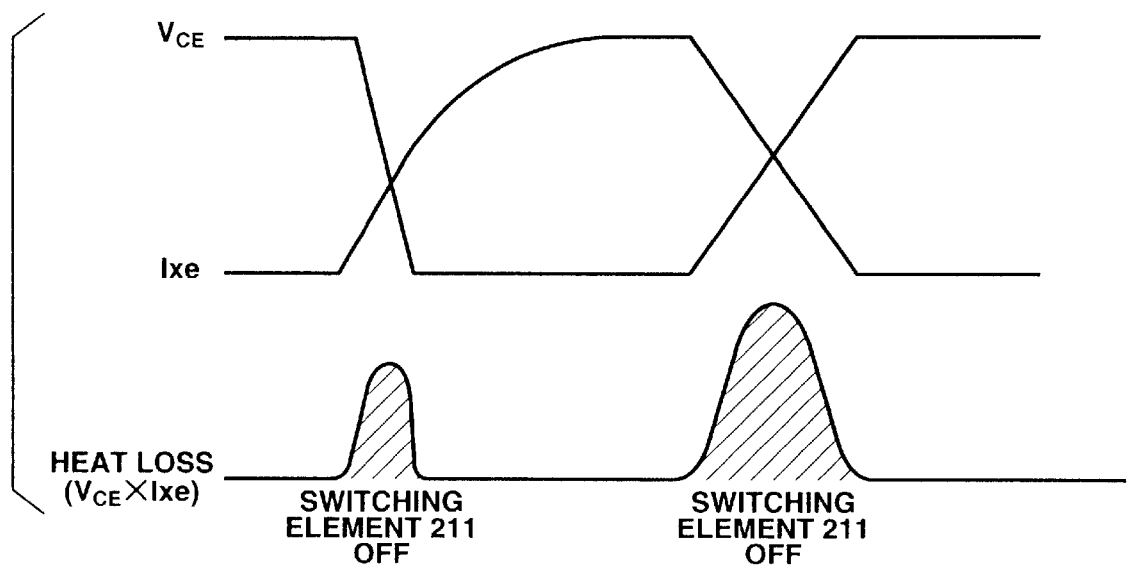
FIG. 8 is a time chart for elucidating the function of the stroboscopic unit in the embodiment of the camera.

As shown in FIG. 8, when the switching element 211 turns on, the voltage Vce between the collector and the emitter falls and arrives at the ground level with certain time duration. Consequently, the exciting current Ixe for the Xe current gradually increase with the time duration. Similarly, when the switching element 211 turns off, the voltage Vce between the collector and the emitter rises with certain duration and therefore the exciting current Ixe for the Xe lamp gradually decreases with the time duration.

At such a moment of the ON/OFF operation of the switching element 211, a heat loss (=a product Vce×Ice of the Vce between the collector and the emitter and the exciting current Ixe for the Xe lamp) is produced in the switching element 211.

In the case of the flat light emission (intermittent light emission), as described above, the repeated ON/OFF activation of the switching element 211 provides to generate the heat which is proportional to the product of the heat loss (Vce×Ixe) at each time of turning on or off in the switching element 211 and the number of the turning on or off, i.e., the frequency of light emission in the Xe lamp 210. When the amount of the heat exceeds a value permissible for the switching element 211, it is possible that the switching element 211 breaks down.

Generally, it can be stated that a shorter cycle of the light emission provides a less irregularity in the intensity of light exposing a film. However, the amount of heating increases due to the increase in the number of the switching events for the switching element 211, as described above. In particular, in the case of the sequential photographing mode (the mode of photographing being continually) for a camera, the amount of heat generated increased, thereby there is an increased possibility that the thermal breakdown occurs in the switching element 211.

In view of these facts, the stroboscopic unit in the camera according to the invention is designed such that the CPU 212 is equipped with a function for determining a flat light emission (intermittent light emission) pattern for the Xe lamp 210, which results from the ON/OFF activation of the switching element 211 in accordance with either whether or not the sequential photographing mode is employed or the number of events being sequentially photographed.

More specifically, the stroboscopic unit is designed such that, in the photographing mode other than the sequential photographing mode, for instance in the single photographing mode, the period of the flat light emission is decreased and in the sequential photographing mode the period of the flat light emission is increased although the total quantity of light remains unchanged.

As a result, in the sequential photographing mode, an instantaneous increase in the temperature of the switching element 211 can be suppressed, although the irregularity of the light quantity occurs to some extent. Accordingly, the switching element 211 can be prevented from the thermal breakdown because of the reduced total heat loss of the switching element 211.

Figure 9:
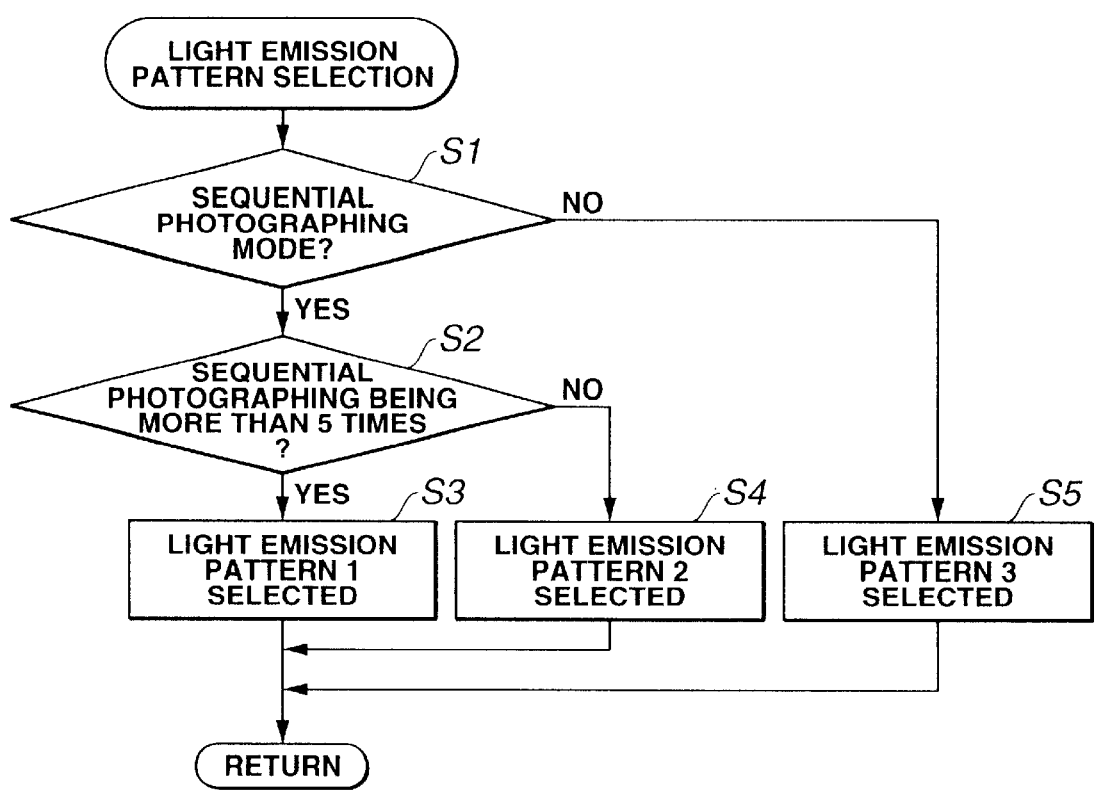
FIG. 9 is a time chart for elucidating the operation of the flat light emission using the stroboscopic unit in the embodiment of the camera.

Referring now to the flow charts in FIG. 9, the selection of the light emission pattern for the flat light emission will be described in the sequential photographing mode and in the photographing mode other than the sequential photographing mode.

When the flat light emission mode is selected by utilizing the stroboscopic mode changing switch 14 (or 110), CPU 212 (or the control circuit 1) performs the subroutine of selecting the light emission pattern.

When the stroboscopic mode-changing switch 14 (or 110) has already been set in the flat light emission mode, the subroutine of selecting the light emission pattern is executed prior to each exposure for the photographing. Consequently, the flat light emission during the exposure is realized by driving the stroboscopic unit with the light emission pattern determined by the subroutine.

In accordance with the subroutine of selecting the light emission pattern, CPU 212 (or the control circuit 1, hereinafter denoted simply by CPU 212) determines at step S1 whether or not the photographing mode selected by the camera operation mode-changing switch 15 (or the mode changing switch 117) is the sequential photographing mode. When it is ascertained that the sequential photographing mode is set, step S2 is executed. When it is ascertained that the sequential photographing mode is not set and the photographing mode other than the sequential photographing mode is set, step S5 is executed.

When it may be ascertained that the sequential photographing mode is set in the step S1, CPU 212 judges at the step 2 whether or not the next exposure for photographing is the fifth exposure in the sequential photographing mode.

In the step 2, it is judged that the current exposure for photographing is, for instance, the first one, i.e., the first frame to be photographed in the sequential photographing mode, CPU 212 selects the light emission pattern 2 in the step S4, and then drives the switching element 211 by the flash signal FLSH on the basis of the selected light emission pattern 2, so that the flat light emission is emanated from the Xe lamp 210 in accordance with the light emission pattern 2. After end of the first sequential photographing, the flow returns to the step S1. As described above, the flat light emission due to the light emission pattern 2 is carried out, till the sequential photographing is four times made or till the four frames are photographed.

Subsequently, either when it is judged in the step S2 that the sequential photographing is more than five times carried out or when the five frames are photographed, CPU 212 selects the light emission pattern 1 in step 3, and then activates the switching element 211 by the flash signal FLSH due to the selected light emission pattern, thereby enabling the flat light emission to be carried out from the Xe lamp 210 in accordance with the light emission pattern 1.

When it is judged in the step S1 that the photographing mode other than the sequential photographing mode is selected, in step S5 CPU 211 outputs the flash signal FLSH for providing the flat light emission to the Xe lamp 210 with the light emission pattern 3, thus providing the flat light emission due to the light emission mode 3. At the end of the photographing mode other than the sequential photographing mode where the light emission mode 3 is used, the flow goes to the return.

Regarding the light emission pattern 1 in the step S3, the light emission pattern 2 in the step S4 and the light emission pattern 3 in the step S5, the light emission period is set to be 45 μS, 40 μS and 30 μS for the light emission pattern 1, the light emission pattern 2 and the light emission pattern 3, respectively.

TABLE 1

| LIGHT EMISSION PATTERN | LIGHT EMISSION PERIOD |
| --- | --- |
| 1 | 45 μS |
| 2 | 40 μS |
| 3 | 30 μS |

The periods for the respective light emission patterns in the Table 1 are those at which it was experimentally confirmed by the present inventors that no thermal breakdown of the switching element 211 took place. However, the present invention is not restricted to these values for the period, because they are altered in accordance with the property of the switching element 211 and the circumference in which the related elements are disposed. In other words, the amount of heat generated by the switching action of the switching element can be suppressed within the range in which no thermal breakdown arises by selecting the period in the flat light emission in accordance with the photographing mode used in the flat light emission mode.

As another factor for the thermal breakdown of the switching element 211, it is conceivable that when the charging capacitor 209 consumes a greater amount of accumulated charge in the flat light emission operation of the switching element 211, an increased load of the circuit for charging the charging capacitor 209 causes the charging circuit including the charging capacitor 209 to be heated up. Such a charging circuit is normally disposed at a position relatively close to the switching element 211 on the same circuit board. Accordingly, the heat in the discharging circuit is transferred to the switching element 211, so that the heat from the switching element 211 itself and the heat transferred from the discharging circuit induce the thermal breakdown of the switching element 211.

To avoid such a trouble, the amount of light to be emitted can be reduced in the above-mentioned light emission patterns 1 and 2. That is, it is conceivable that the amount of charges discharged from the charging capacitor 209 is reduced and therefore a greater amount of charge is retained, thereby reducing the magnitude of heating in the charge process.

In this case, however, it is necessary that data regarding the amount of light emission should be added to the data for the period of the light emission in the light emission pattern.

In other words, in order to reduce the amount of light in the flat light emission, the time interval for light emission can be reduced. The time $t_1$ during which the light emission current Ixe of the Xe lamp 210 flows, as shown in FIG. 10B, is set to be smaller than the time $t_2$ in the signal of FIG. 10C for the signal TRG shown in FIG. 10A ($t_1 > t_2$). With this procedure, a greater amount of the charge in the charging capacitor 209 can be retained, thereby enabling the load for the subsequent charging to be reduced.

Since the voltage for charging of the charging capacitor 209 gradually decreases in the course of the flat light emission, the time interval for light emission must be increased to hold a constant light emission quantity in the flat light emission ($t_1 < t_1'$ or $t_2 < t_2'$). Even in this case, the time interval for the light emission current of the Xe lamp 210 must be set to be $t_1' > t_2'$.

Hence, with this procedure, it is possible that the charging load of the charging circuit is reduced and the switching element is prevented from thermal breakdown.

The stroboscopic unit in the camera according to the invention is capable of the suppressing the heating of the switching element for controlling the stroboscopic light emission in the flat light emission mode, thereby enabling the trouble of the heating of the switching element to be prevented and further making it possible to achieve sequential photographing without missing a shutter chance.

In this invention, it is apparent that working modes different in a wide range can be formed on the basis of this invention without departing from the spirit and scope of the invention. This invention is not restricted by any specific embodiment except as limited by the appended claims.

What is claimed is:

1. A camera including a stroboscopic light emission unit capable of operating at least in an intermittent light emission mode, said camera comprising:

a photographing mode setting unit for setting said camera either in a single photographing mode or in a sequential photographing mode; and a light emission period setting unit for setting a period of intermittent light emission for said stroboscopic light emission unit in accordance with the photographing mode set by the photographing mode setting unit.

2. A camera according to claim 1, wherein said light emission period setting unit sets the period of the intermittent light emission of the stroboscopic light emission unit in the sequential photographing mode to be greater than in the single photographing mode, when said camera is set in the sequential photographing mode.

3. A camera according to claim 2, wherein said light emission period setting unit sets the period of the intermittent light emission of the stroboscopic light emission unit in accordance with a number of sequential photographings, when said camera is set in the sequential photographing mode.

4. A camera according to claim 3, wherein said light emission period setting unit sets the period of the intermittent light emission of said stroboscopic light emission unit to be longer in a predetermined number of the sequential photographings, when said camera is set in the sequential photographing mode.

5. A camera according to claim 4, wherein said stroboscopic light emission unit performs a light emission having a shorter time interval in the sequential photographing mode than in the single photographing mode.

6. A camera including a stroboscopic light emission unit and a focal-plane shutter, wherein said stroboscopic light emission unit is operated in a flat light emission mode in which an intermittent fine light emission is carried out with a predetermined period during opening of said focal-plane shutter, said camera comprising:
  a photographing mode setting unit for setting said camera either in a single photographing mode or in a sequential photographing mode; and
  a light emission period setting unit for varying a period of the intermittent light emission of said stroboscopic light emission unit in said flat light emission mode in accordance with the photographing mode set by said photographing mode setting unit.

7. A camera according to claim 6, wherein said light emission period setting unit sets the period of the intermittent light emission of the stroboscopic light emission unit in the sequential photographing mode to be greater than in the single photographing mode, when said camera is set in the sequential photographing mode.

8. A camera according to claim 7, wherein said light emission period setting unit sets the period of the intermittent light emission of the stroboscopic light emission unit in accordance with a number of sequential photographings, when said camera is set to be in the sequential photographing mode.

9. A camera according to claim 8, wherein said light emission period setting unit sets the period of the intermittent light emission for said stroboscopic light emission unit to be longer in a predetermined number of the sequential photographings, when said camera is set in the sequential photographing mode.

10. A camera according to claim 9, wherein said stroboscopic light emission unit performs a light emission having a shorter time interval in the sequential photographing mode than in the single photographing mode.

* * * * *